(12) United States Patent
Staub

(10) Patent No.: US 6,748,051 B1
(45) Date of Patent: Jun. 8, 2004

(54) 911 STATUS SYSTEM AND METHOD

(75) Inventor: David Brian Staub, Kensington, CT (US)

(73) Assignee: Network Expert Software Systems, Inc., Kensington, CT (US)

( * ) Notice: Subject to any disclaimer, the term of this patent is extended or adjusted under 35 U.S.C. 154(b) by 791 days.

(21) Appl. No.: 09/619,225

(22) Filed: Jul. 19, 2000

Related U.S. Application Data

(60) Provisional application No. 60/196,642, filed on Apr. 12, 2000.

(51) Int. Cl.[7] .............................................. H04M 11/00

(52) U.S. Cl. ............................. 379/37; 379/45; 379/134

(58) Field of Search ............................... 379/45, 37, 38, 379/39, 40, 32.01, 32.02, 32.04, 133, 134

(56) References Cited

U.S. PATENT DOCUMENTS

| | | | | | |
|---|---|---|---|---|---|
| 5,239,570 | A | * | 8/1993 | Koster et al. | 379/45 |
| 5,454,025 | A | * | 9/1995 | Mulrow et al. | 379/45 |
| 5,661,779 | A | * | 8/1997 | Lee | 379/45 |
| 6,359,976 | B1 | * | 3/2002 | Kalyanpur et al. | 379/134 |
| 6,529,594 | B1 | * | 3/2003 | Brockman et al. | 379/134 |
| 6,600,811 | B1 | * | 7/2003 | Patel et al. | 379/45 |
| 2001/0028706 | A1 | * | 10/2001 | Nolting | 379/134 |

* cited by examiner

Primary Examiner—Stella Woo
(74) Attorney, Agent, or Firm—Law Office of Dale B. Halling, LLC

(57) ABSTRACT

A 911 status system (10) includes a first data acquisition server (12) that monitors a first telephone company portion (16) of a 911 network (18). A second data acquisition server (20) monitors a second telephone company portion (22) of the 911 network (18). A network (26) is connected to the first data acquisition server (12) and the second data acquisition server (20). A processing and distribution server (28) is connected to the network (26).

25 Claims, 4 Drawing Sheets

911 STATUS SYSTEM AND METHOD

This application claims the benefit of provisional application No. 60/196,642 filed Apr. 12, 2000.

FIELD OF THE INVENTION

The present invention relates generally to the field of 911 emergency systems and more particularly to a 911 status system and method.

BACKGROUND OF THE INVENTION

Local telephone service may be provided by a number of different companies within a given geographic area. For instance, incumbent local exchange carriers (ILECs), competitive local exchange carriers (CLECs), cable companies and wireless companies may all provide local telephone service in a geographic area. Agencies that provide emergency services to a community, such as Police, Fire and EMT departments commonly setup a 911 emergency service bureau. The emergency service bureau is served by just one of the local exchange carriers. As a result, multiple companies may be responsible for parts of a 911 call. These companies must share information in order to provide reliable 911 service. Presently there is no way for these companies to share information about parts of the network that may affect 911 service. In addition, most companies are extremely reluctant to share information with their competitors.

Thus there exists a need for a 911 status system that shares information on the 911 network between multiple companies, without giving away competitive information.

BRIEF DESCRIPTION OF THE INVENTION

DETAILED DESCRIPTION OF THE DRAWINGS

A 911 status system includes a first data acquisition server that monitors a first telephone company portion of a 911 network. A second data acquisition server monitors a second telephone company portion of the 911 network. A network is connected to the first data acquisition server and the second data acquisition server. A processing and distribution server is connected to the network. The system shares information on the 911 network between multiple companies, without giving away competitive information.

Figure 1:
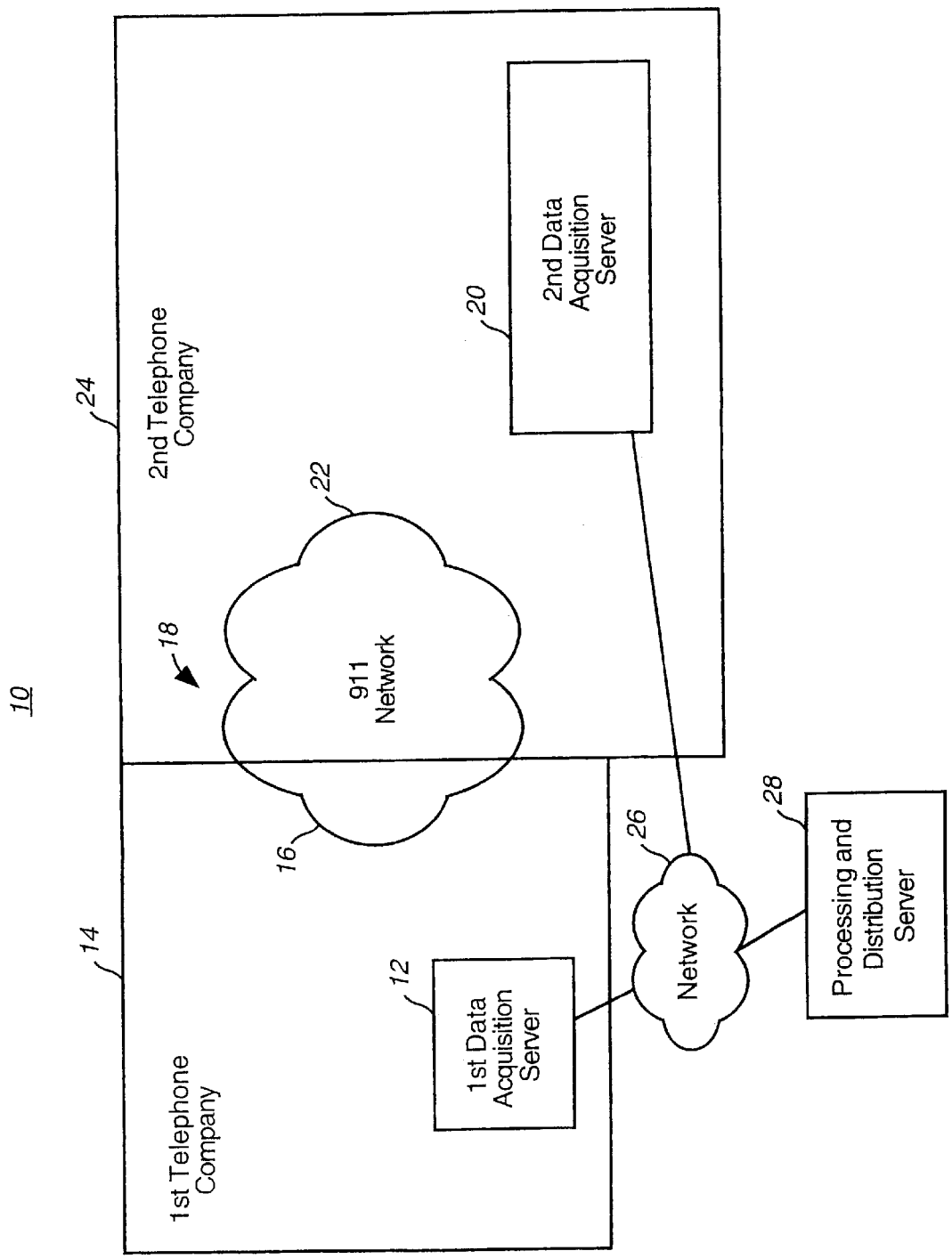
FIG. 1 is a block diagram of a 911 status system in accordance with one embodiment of the invention.

FIG. 1 is a block diagram of a 911 status system 10 in accordance with one embodiment of the invention. The 911 status system has a first data acquisition server 12 as part of a first telephone company 14. The first data acquisition server 12 monitors a first telephone company portion 16 of the 911 network 18. A second data acquisition server 20 monitors a second telephone company portion 22 of the 911 network 18. The second data acquisition server 20 may be controlled by the second telephone company 24. A network (e.g. the internet) 26 is connected to the second data acquisition server 20 and the first data acquisition server 12. A processing and distribution server 28 is connected to the network 26. The data acquisition servers 12, 20 forward status information about their portion of the 911 network to the processing and distribution server 28. The processing and distribution server 28 catalogs the status messages and determines if there is a problem. When a problem is detected in the 911 network, an alerting message can be sent to the appropriate company officials. The message may only include the information required to fix or adjust to the problem. This filtering and organizing of the status information, reduces the problem of two (or more) competing companies sharing data about their networks.

In one embodiment, the users can access the status information from the processing and distribution server through the network 26. In another embodiment, the server 28 may send a message through a pager network. In another embodiment, the users are provided with a terminal at the processing and distribution server 28. Various security procedures are used to ensure that only authorized people are allowed access to the 911 status information. These security procedures include an identification and authorization process.

Figure 2:
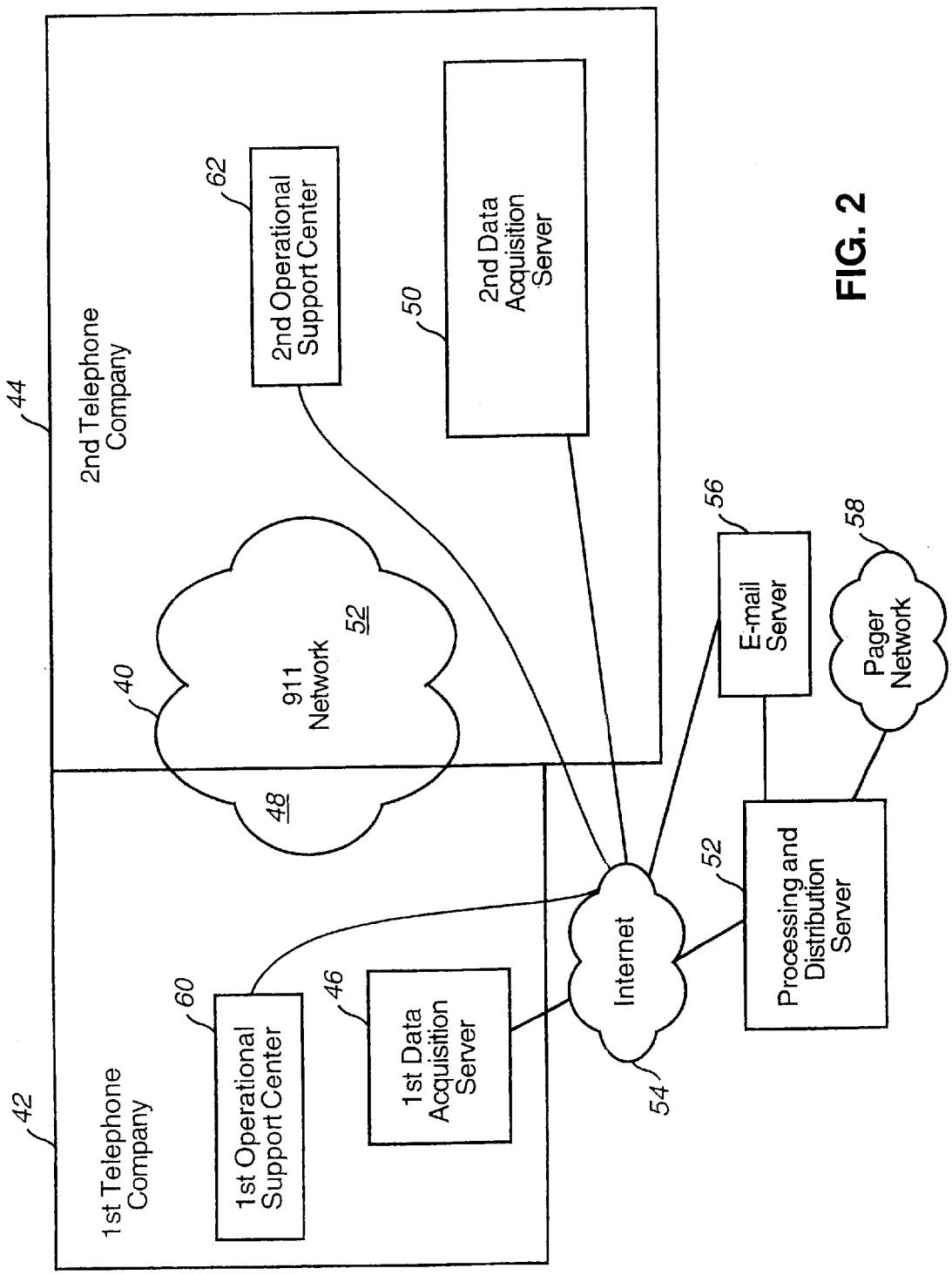
FIG. 2 is a block diagram of a 911 status system in accordance with one embodiment of the invention.

FIG. 2 is a block diagram of a 911 status system in accordance with one embodiment of the invention. A 911 network 40 straddles two telephone companies 42, 44. A first data acquisition server 46 monitors a first telephone company's portion 48 of the 911 network 40. In one embodiment, the first data acquisition server 46 includes an encryption system. A second data acquisition server 50 monitors a second company's portion 52 of the 911 network 40. The data acquisition servers 46, 50 are connected to a processing and distribution server 52 by the internet 54. Note that networks other than the internet can also be used. The processing and distribution server 52 collects status information from the data acquisition servers 46, 50. This status information is cataloged and compared against thresholds to determine if there is a problem with the 911 network 40. When a problem is discovered an alert message can be sent by email through an email server 56. Alternatively the alert message can be sent through a pager network 58.

Authorized users of the two telephone companies can access certain information from either a first operational support center 60 or from a second operational support center 62. The second operational support center includes a display system. In one embodiment, the display system includes a geographic view of the 911 system. In one embodiment, the geographic view includes a color coding system for a component of the 911 system. Note that users from the first (one company) telephone company cannot access the raw data associated with the second (other company) telephone company's portion of the 911 network 52. The raw data is cataloged and organized. A user is only provided with the required information on the other company's part of the 911 network necessary for them to handle any problems.

Figure 3:
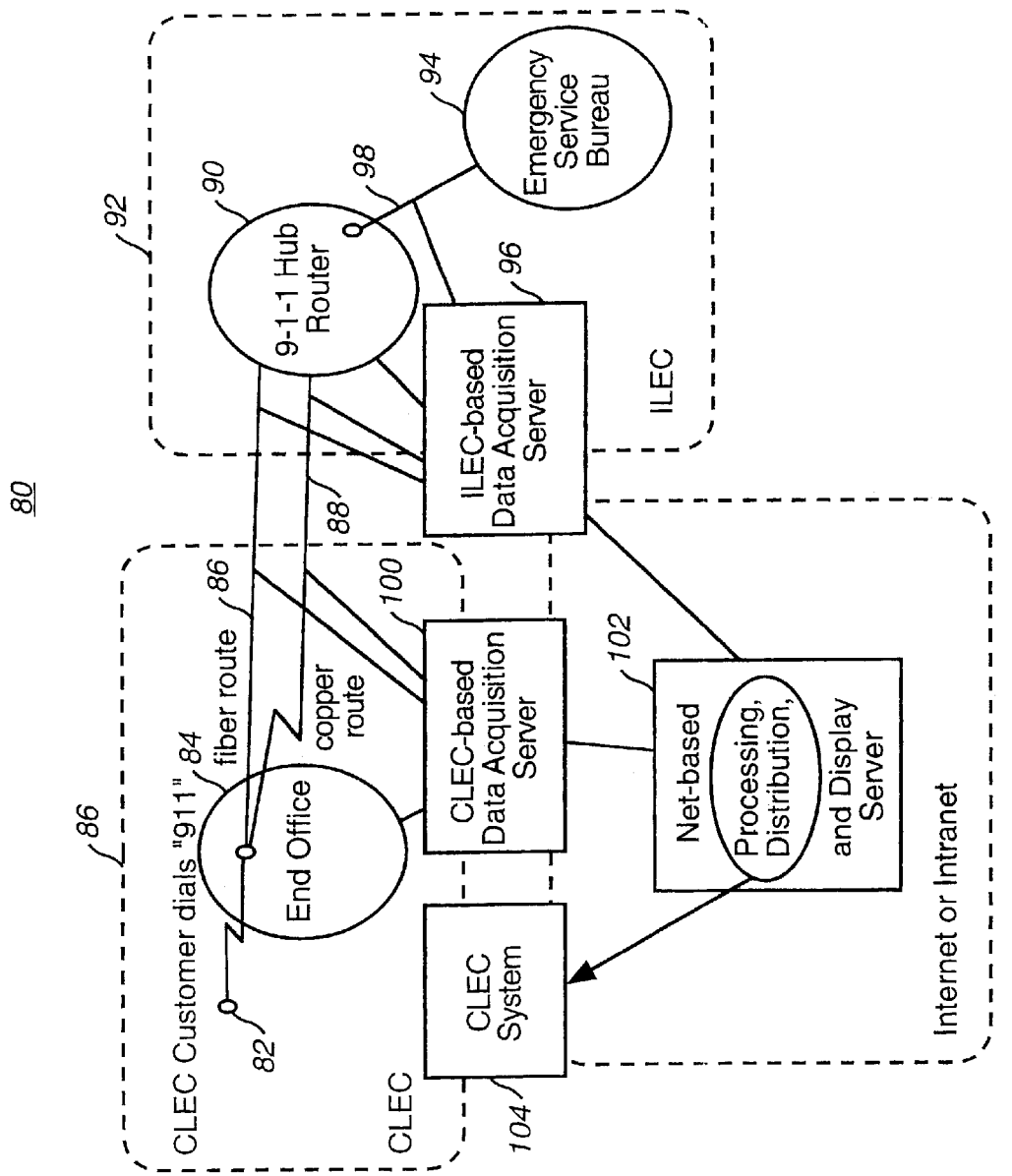
FIG. 3 is a block diagram of a 911 status system in accordance with one embodiment of the invention.

FIG. 3 is a block diagram of a 911 status system 80 in accordance with one embodiment of the invention. A competitive local exchange carrier (CLEC) customer 82 dials "911". The call is received by an end office 84 in a CLEC's telephone network 86. The call is then routed over either a fiber optic cable. 86 or a copper cable 88 to a 911 router 90. The 911 router 90 is part of an incumbent local exchange carrier (ILEC) telephone network 92. The 911 router 90 forwards the call to an emergency service bureau 94. A ILEC-based data acquisition server 96 monitors status messages about the 911 router 90, their portion of the fiber route 86, their portion of the copper route 88 and the link 98 between the router 90 and the emergency service bureau 94. A CLEC-based data acquisition server 100 monitors their portion of the fiber route 86 and their portion of the copper route 88. All status messages collected by the data acquisition servers 96, 100 are forwarded to a net-based processing, distribution and display server 102. The server 102 catalogs the status messages and determines if there are any problems with the 911 network. The server 102 is connected to the data acquisition server 96, 100 by either the internet or an intranet. The display server 102 allows authorized users to access information about the status of the 911 network. A CLEC system 104 provides remote access to the display functions of the server 102. Note that while the above example only shows two telephone companies, the system will work with any number of telephone companies.

Figure 4:
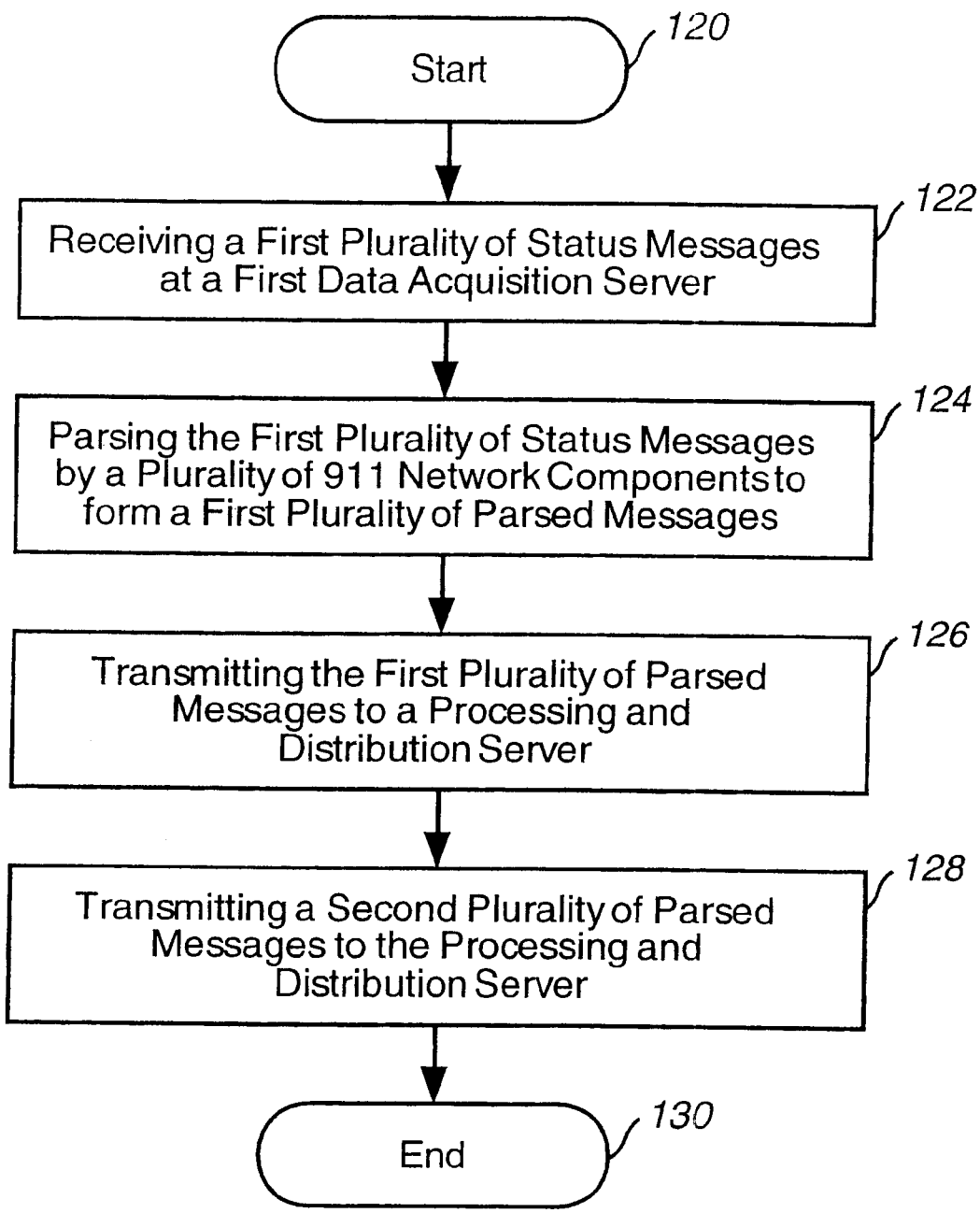
FIG. 4 is a flow chart of the steps used in a method of operating a 911 status system in accordance with one embodiment of the invention.

FIG. 4 is a flow chart of the steps used in a method of operating a 911 status system in accordance with one embodiment of the invention. The process starts, step 120, by receiving a first plurality of status messages at a first data acquisition server at step 122. The first plurality of messages are parsed for a plurality of 911 network components to form a first plurality of parsed messages at step 124. The network components are the categories used by the parser. In one embodiment the parsed messages are reformatted. The first plurality of parsed messages are transmitted to a processing and distribution server at step 126. At step 128, a second plurality of parsed messages are transmitted to the processing and distribution server which ends the process at step 130. In one embodiment, the first plurality of parsed messages are cataloged to form a tally for a plurality of objects. An object can be a physical resource such as a telephone line or a switch. The tally is compared to a threshold for each of the plurality of objects. When the tally exceeds the threshold, an alarm message (alarm condition) is transmitted to a first operational support center and a second operational support center.

In one embodiment, a second plurality of status messages are received at a second data acquisition server. The second plurality of status messages are parsed for a plurality of 911 components to form the second plurality of parsed messages. The 911 components are the categories used to determine how the message is parsed. In one embodiment the first plurality of parsed messages are encrypted. In another embodiment, the first plurality of parsed messages are sent over an internet.

In one embodiment, a connection request is received by the processing and distribution server. Next it is determined if the connection request is from the first data acquisition server or the second data acquisition server. When the connection request is not from the first data acquisition server or the second data acquisition server the connection request is refused. This security measure ensures that only the data acquisition servers are allowed access to the processing and distribution server.

The 911 status system and method described herein shares information on the 911 network between multiple companies, without giving away competitive information.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A 911 status system, comprising:
   a first data acquisition server monitoring a first telephone company portion of a 911 network;
   a second data acquisition server monitoring a second telephone company portion of the 911 network;
   a network connected to the first data acquisition server and the second data acquisition server; and
   a processing and distribution server connected to the network.

2. The system of claim 1, wherein the first data acquisition server receives a status message from the first telephone company portion of the 911 network and forwards the status message to the processing and distribution server.

3. The system of claim 2, wherein the first data acquisition server parses the status message and reformats the status message before forwarding the status message to the processing and distribution server.

4. The system of claim 1, wherein the network is an internet.

5. The system of claim 1, wherein the processing and distribution server monitors a plurality of status messages.

6. The system of claim 5, wherein the processing and distribution server determines if an alarm condition exists.

7. The system of claim 6, wherein the processing and distribution server transmits an alarm message to a first operational support server of a first telephone company.

8. The system of claim 6, wherein the processing and distribution server transmits an alarm message to a second operational support center of a second telephone company.

9. The system of claim 8, wherein the second operational support center includes an identification and authorization process.

10. The system of claim 8, wherein the second operational support center includes a display system, the display system having a geographic view of the 911 system.

11. The system of claim 10, wherein the geographic view includes a color coding system for a component of the 911 system.

12. The system of claim 6, wherein the processing and distribution center transmits an alarm message via a pager network.

13. The system of claim 6, wherein the processing and distribution server transmits an alarm message in an email message.

14. The system of claim 1, wherein the first data acquisition server includes an encryption system.

15. The system of claim 1, wherein the processing and distribution server rejects a connection request not from the first data acquisition server or the second data acquisition server.

16. A method of operating a 911 status system, comprising the steps of:
   a) receiving a first plurality of status messages at a first data acquisition server;
   b) parsing the first plurality of status messages for a plurality of 911 network components to form a first plurality of parsed messages;
   c) transmitting the first plurality of parsed messages to a processing and distribution server; and
   d) transmitting a second plurality of parsed messages to the processing and distribution server.

17. The method of claim 16, further including the steps of:
   e) cataloging the first plurality of status messages and the second plurality of parsed messages to form a tally for a plurality of objects;

f) comparing the tally to a threshold for each of the plurality of objects;

g) when the tally exceed the threshold, transmitting an alarm message to a first operational support center and a second operational support center.

18. The method of claim 16, wherein step (d) further includes the steps of:

d1) receiving a second plurality of status messages at a second data acquisition server;

d2) parsing the second plurality of status messages for a plurality of 911 components to form the second plurality of parsed messages.

19. The method of claim 16, wherein step (c) further includes the step of:

c1) encrypting the first plurality of parsed messages.

20. The method of claim 16, wherein step (c) further includes the step of:

c1) transmitting the first plurality of parsed messages over an internet.

21. The method of claim 20, wherein step (d) further includes the steps of:

d1) receiving a connection request at the processing and distribution server;

d2) determining if the connection request is from the first data acquisition server or the second data acquisition server;

d3) when the connection request is not from the first data acquisition server or the second data acquisition server, refusing the connection request.

22. A 911 status system, comprising:

a first data acquisition server monitoring a first portion of a 911 network;

a second data acquisition server monitoring a second portion of the 911 network; and a processing and distribution server connected to the first data acquisition server and the second data acquisition server by an internet.

23. The system of claim 22, further including a first telephone company controlling the first portion of the 911 network.

24. The system of claim 22, further including a second telephone company controlling the second portion of the 911 network.

25. The system of claim 22, further including a third telephone company having a third data acquisition server connected to the processing and distribution server.

* * * * *